Sept. 10, 1974  D. CIAMBRONE  3,835,039
WASTE WATER TREATMENT SYSTEM
Filed Dec. 22, 1972  3 Sheets-Sheet 1

United States Patent Office

3,835,039
Patented Sept. 10, 1974

3,835,039
WASTE WATER TREATMENT SYSTEM
David Ciambrone, El Cajon, Calif., assignor to Cubic Corporation, San Francisco, Calif.
Filed Dec. 22, 1972, Ser. No. 317,729
Int. Cl. C02c 1/04
U.S. Cl. 210—17
17 Claims

ABSTRACT OF THE DISCLOSURE

A system for treating waste water by feeding the waste water into an aerobic treatment separator, which separator utilizes a plurality of fibers bunched into groups providing recesses for aerobic bacteria with the ends of the fibers fitting into openings in the bottom of the separator, for providing filtering of the water passing through the separator and subject to aerobic treatment. The waste water from the separator is then treated by ozone in conduits which ozone and air gas under pressure moves the filtered waste water and treats and kills bacteria in the waste water through the conduits to a surge tube with the waste water and ozone moving in the same direction. The treated water is then filtered for discharge.

BACKGROUND OF THE INVENTION

There are many known systems for processing sewage to various degrees of non-contaminated or substantially non-contaminated outputs. These systems use, for example, anaerobic treatment chambers or aerobic treatment chambers. Chlorine and other bacterial killing gases are often applied to the fluids discharged from the aforesaid chambers in an attempt to kill the bacterial therein. Usually these known systems comprise large installations requiring large tanks, pumps, open receptacles and the like. An anaerobic system that is capable of handling a reasonable amount of sewage normally requires a large, air-free septic tank. The aerobic systems often comprise large containers exposed to air in which sludge settles to the bottom of the containers, with the liquid being drawn off from the upper surface. Such aerobic settling systems require large installations to handle volume sewage processing and normally requires time consuming settling and recycling that increases the processing time. Such anaerobic or aerobic systems as are known, are not practical for small compact waste water treatment systems. Further such systems are basically inefficient, have large space requirements, normally require transportation of sewage for considerable distances, and cannot provide "on-location" waste water or sewage treatment. So there is a recognized need for smaller systems such as packaged waste water treatment systems.

There have been systems dveloped in which waste water or sewage is pumped into a tank and air is then injected into the tank under pressure, providing air bubbling and agitation of the sewage to speed up the function of air using bacteria. Such systems normally use gravitational separation of the sludge from the clean water liquid and thus are slow in operation and require large tank installations to process even small volumes of sewage or waste water. Further the sewage is normally still carried in a raw form to a processing installation and is not properly broken down for the later treatment. Chlorine is usually used for chlorination processing to kill bacteria, however this is oftentimes ineffective because the particles are so large in size that it is difficult through normal chlorine processing to kill the bacteria. So the fluid discharged is often contaminated and not capable of immediate use.

Thus it is advantageous to have a method and apparatus for processing waste water in a compact, high capacity system that discharges water capable of immediate re-use if desired.

SUMMARY OF THE INVENTION

In an exemplary embodiments of the method and apparatus of this invention, sewage or waste water is fed to a digester-separator. This digester-separator comprises a container having a lower bulkhead leading to a sump with openings through the bulkhead. Elongated fiber bundles are positioned in the container and the container is air vented. Thus aerobic bacteria live in the cotnainer and in the recesses around the fibers and treat the waste water. The lower ends of the fibers are bunched into the openings, so that the water passing through the openings by gravity are filtered by the fibers. The filtered water or effluent passes into the sump and then through a plurality of conduits that are interconnected and vertically positioned. Ozone is generated and injected under pressure into the conduits through porous tubes that extend along the length of each of the conduits. This wide dispersion of ozone in the water effluent reduces the remaining bacteria and solids in the water.

The water effluent is inserted into the lower most conduit, and the ozone and air under pressure functions as a pump to raise the water effluent through the conduits, which water effluent then passes to a surge tube. Thus the ozone flows with the water effluent out of the system rather than back into the sump. The ozone treated water is discharged into a surge tube, where it is again treated with ozone and then pumped through a suitable filter for discharge. The latter filter provides clear, clean discharge water.

The ozone is generated in an ozone generator comprising a plurality of banks of ultra-violet lamps through which air is blown by a blower and which as an ultra-violet light, impervious, reflector baffle positioned therebetween.

Thus a compact, highly-efficient and high-volume system is provided with aerobic digestion, that reduces the particles to a small size. The aerobic treated effluent is then filtered, filtering out the large particles, with the relatively particle free effluent being treated with ozone. The ozone treatment in a plurality of steps assuring maximum contact of the ozone with the bacteria, thus assuring a relatively purified water discharge. Ozone is additionally added in the surge tube to assure maximum exposure of the water to ozone. The sludge left in the digester is continued to be reprocessed as necessary to reduce it to an oxidized sludge that is physically removed periodically.

It is therefore an object of this invention to provide a new and improved method and apparatus for waste water treatment.

Other objects and many advantages of this invention will become more apparent upon a reading of the following detailed description and an examination of the drawings, wherein like reference numerals designate like parts throughout and in which.

Figure 1:
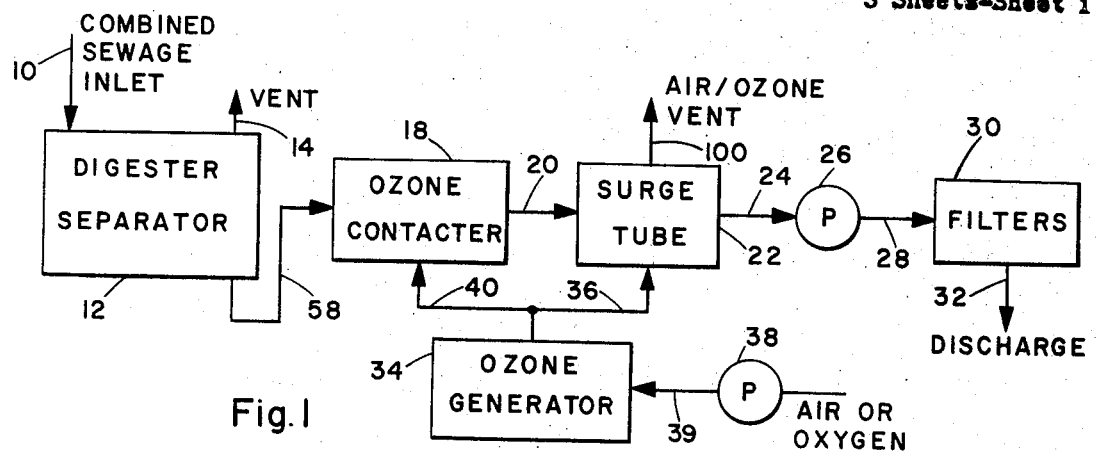
FIG. 1 is a diagrammatic illustration of the steps and parts of the method and apparatus of the water treatment system of this invention.

Referring now to the drawings, FIG. 1 illustrates in block diagram and schematic form, the various component systems of an exemplary embodiment of all of the components, which components are packaged in a single cabinet structure. Referring to FIGS. 1, 2, 3 and 5, inlet waste water, sewage or the like is fed through a collector supply line 10 into a container 12 known as the digester-separator. The digester-separator 12 has a lower bulkhead 52 below which is a sump 44. Positioned in the container 12 are a plurality of groups of fibers 46. These fibers, which for example comprise long strips of wood bark, are supported at their upper end in vertical longitudinal displacement by rack support 48. Rack support 48 may be of any suitable material such as plastic or the like, and is secured at its supporting ends to the bulkhead or separator plate 52. The fibers are pressed into openings in the support tube 48 from which they are supported, and their lower ends are pressed into openings 54 in the bulkhead 52.

The bark fibers are grouped into fairly tight bundles and are in spaced positions throughout the volume 42 of the separator 12. These bundles may, for example, have a diameter of ½ to 1 inch with the lower end of the fibers extending through the openings 54 in the bulkhead 52 a distance of about ½ to 1 inch. The digester-separator container 12 has a vent 14 that allows free flow of air and oxygen into and out of the container.

Figure 2:
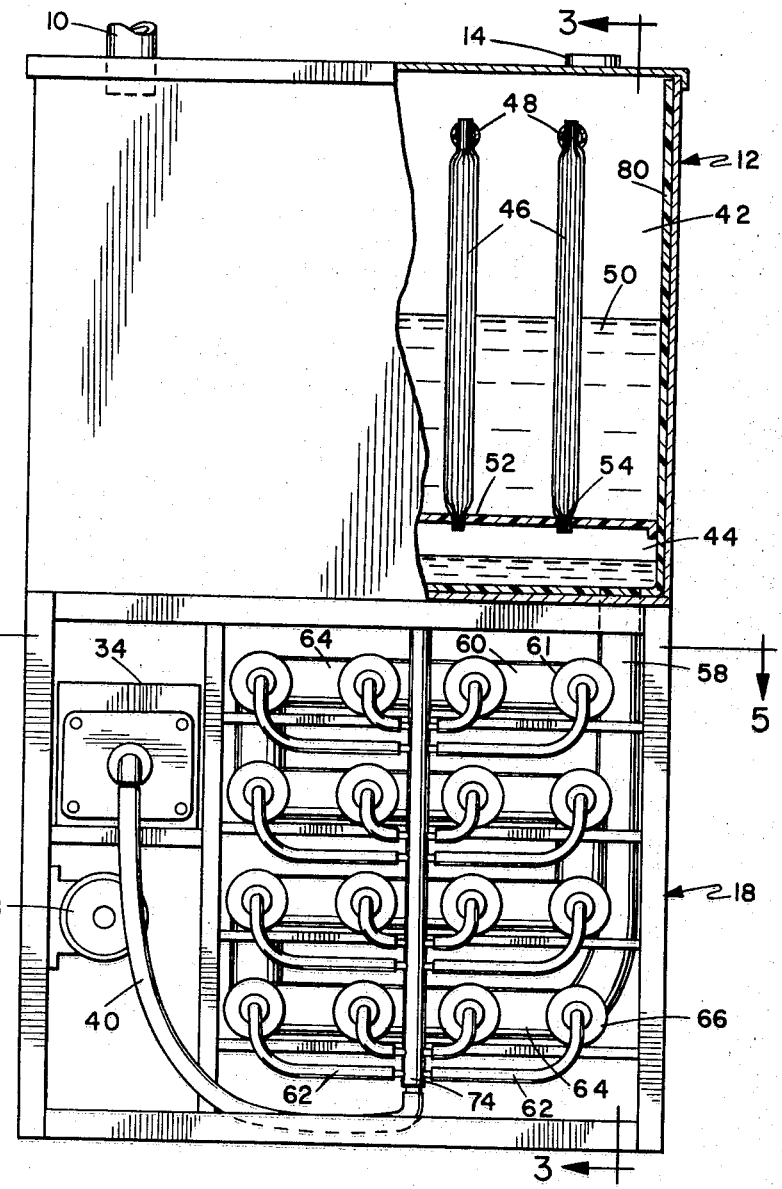
FIG. 2 is a side elevational view with parts broken away and parts in section of a housing that houses the digester-separator, the ozone contactor and ozone generator surge tube and other parts of the system.
Figure 3:
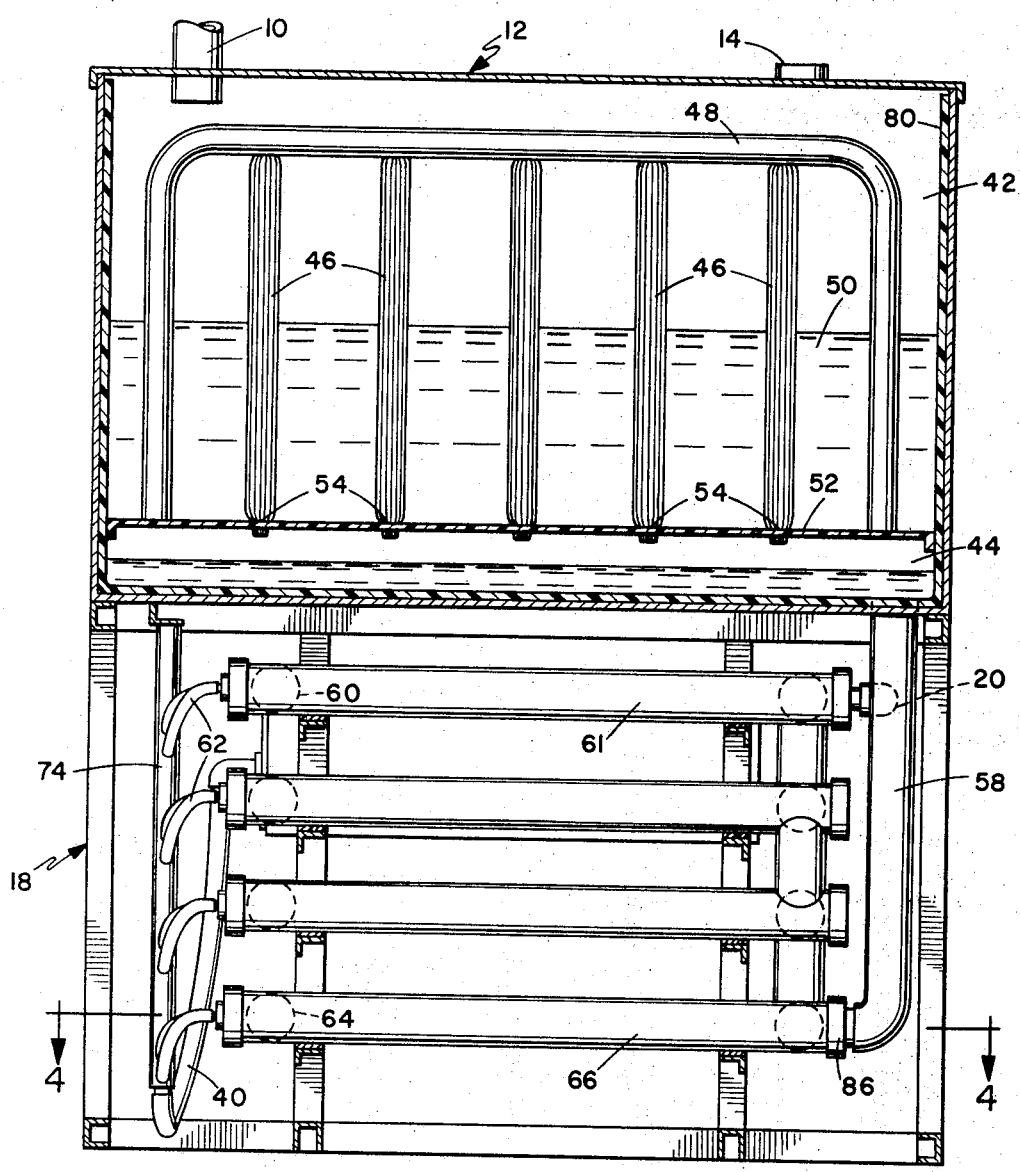
FIG. 3 is a sectional view taken on line 3—3 of FIG. 2.
Figure 4:
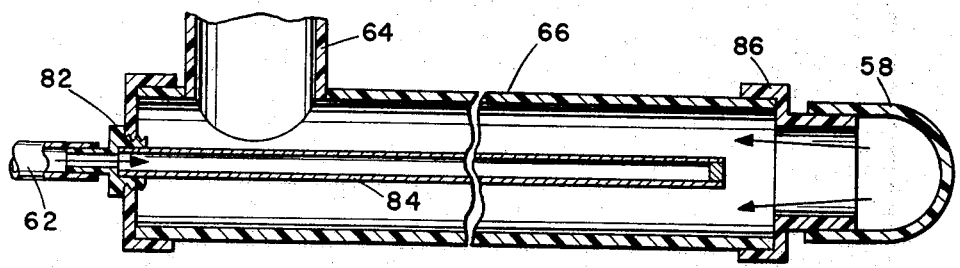
FIG. 4 is a sectional view of one of the conduits of the ozone contactor shown in section.
Figure 5:
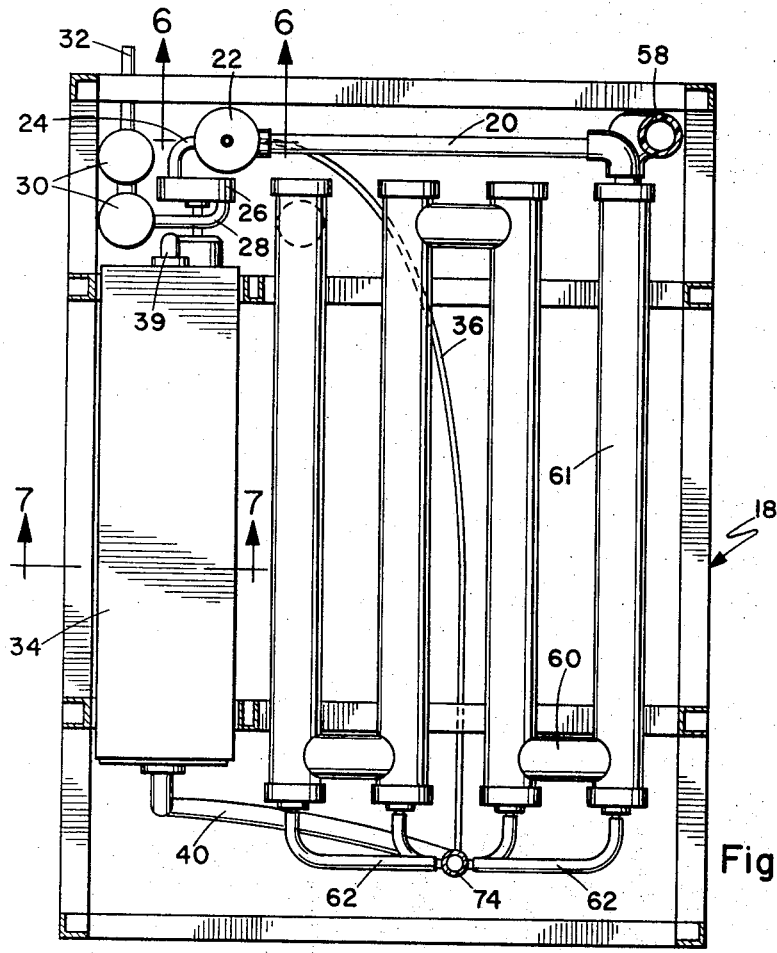
FIG. 5 is a sectional view taken along line 5—5 of FIG. 2.

In operation of the digester-separator 12, the fluid enters through pipe 10 and has for example, a level in the container as illustrated in FIG. 2. The fluid 50 and the particulate matter therein is caused by gravitational movement of the water to move about the fiber bundles 46. Aerobic bacteria in the container 12 receives oxygen through vent 14. The particles will adhere to the bark strips 46 especially when wet. Also the fairly tight bundles of bark 46, provde the surface and recesses for growth of the aerobic bacteria. Thus the aerobic bacteria, or air-using bacteria decompose nutrients in the sewage and reduce the particles to a liquid effluent, gas and sludge. The liquid passes by gravity through the opening 54 into the volume of the sump 44. In this passage, the fluid passes along the length of the bark and through channels in the bundles of the bark and is filtered. Thus the fluid in sump 44 is primarily particle free. The particles that remain in volume 42 of the container 12 are eventually reduced to a fluid by the aerobic bacteria, or form an oxidized sludge in the bottom of the container that is removed periodically by cleaning.

The treated fluid or water then passes from sump 44 through line 58 to a plurality of conduits 61 and 66. These conduits comprise a plurality of conduits that are horizontally and vertically displaced and are interconnected so that the fluid that enters the bottom or input conduit 66 passes through all of the conduit segments 60, 61, 62 and 66 to the discharge. The fluid then passes through discharge tube 20 to the surge tube 22.

Ozone is generated and injected under pressure into the conduits 61 and 66 through a porous tube 84 that extends the length of each of the conduits 61 and 66. This wide dispersion of ozone in the water kills the remaining bacteria in the water. The water is inserted into the lower most conduit 66, and the ozone and air gas under pressure also functions as a pump to raise the water through the conduits which water then passes to the surge tube. So the ozone flows with the water out of the system rather than back into the sump 44. The treated water is discharged into the surge tube 22, where it is again treated with ozone and then pumped through a suitable filter 30 for discharge. The filter 30 imparts a "polish" to the process to achieve clear, clean discharge water.

The ozone is generated in an ozone generator 34 comprising a plurality of banks of ultra-violet lamps 116 through which air is pumped and which has an ultra-violet light, impervious, reflector baffle 14 therebetween. Thus a compact, highly efficient and high volume system is provided that provides aerobic digestion that reduces the particles to a small size. The aerobic treated effluent is then filtered, filtering out the large particles and passing a relatively particle free effluent that is treated with ozone in a plurality of steps assuring maximum contact.

Figure 7:
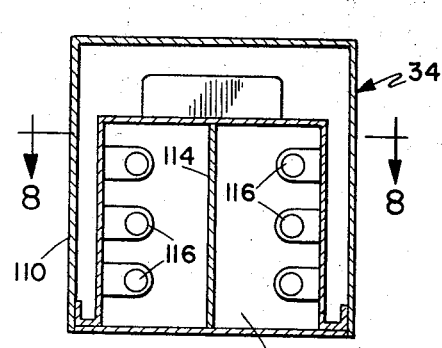
FIG. 7 is a sectional view and side elevation of the ozone generator.
Figure 8:
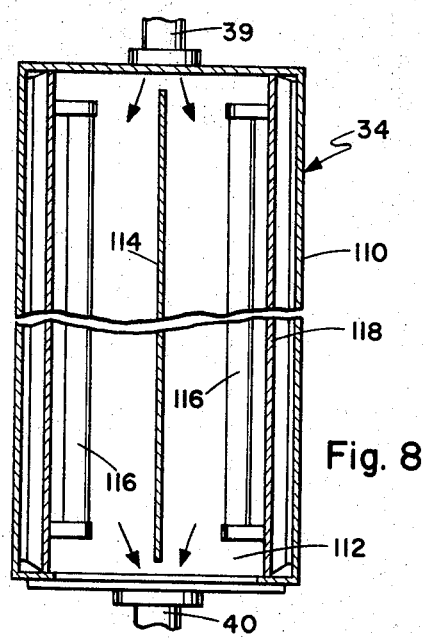
FIG. 8 is a sectional view taken along line 8—8 of FIG. 7.

The ozone is generated in ozone generator 34 and is injected under pressure in each of the conduit segments 66. Referring to FIGS. 1, 7 and 8, air is supplied by a suitable blower 38 through line 39 to housing 118 that has an outer cover 110. Positioned on each side of housing 118 are banks of ultra-violet lamps 116. As the air passes through volume 112 on each side of partition 114, the ultra-violet lamps create ozone in the air that then passes out under pressure through line 40. The partition 114 allows the ultra-violet lamps to radiate the desired amount of ultra-violet light in the restricted volume to maximize the ozone generated in the air passing therethrough. The ozone and air then moves through line 40 to a distributing manifold tube 74, where the ozone and air is then fed under pressure through distributor lines 62 to the individual conduits 66. Each of the conduits 66, for example, has a receiving connector 82 to which the tube 62 connects. Connector 82 supports within the conduit 66 a porous tube 84. The porous tube 84 is made of any suitable, known, porous material that allows the ozone and air gas to enter into the fluid in the conduit along the length of the conduit. This provides maximum distribution of the ozone and air in the fluid in a manner that the gas permeates throughout the fluid treated. Thus the ozone mixes with the water to kill the bacteria and also reduces the particles and solid therein. The ozone also oxidizes detergents and deodorizes the waste gases from the system. This provides disinfection and stability of the liquid effluent. Since the ozone is injected into the each of the conduits at a slight pressure, such as 2 p.s.i., the ozone and gas form a liquid pump that moves the fluid through the various conduit segments to the discharge conduit 61 and to the surge tube 22. This creates a natural flow of the fluid upwardly to the surge tube with the ozone moving with the fluid, and thus the ozone does not move back into the sump 44. The injection of the ozone and air gas under pressure in the multiple conduits form the fluid flow upwardly through the conduit system. Further the injection of ozone into each of the containers provides a continuous ozone contact in the fluid that passes through each of the conduits providing maximum ozone contact.

Figure 6:
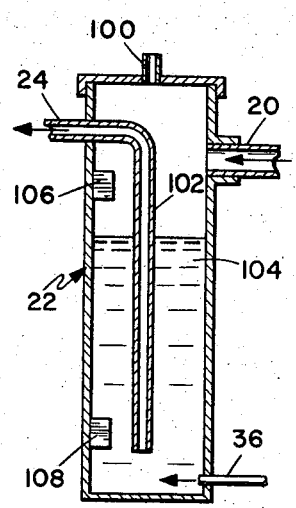
FIG. 6 is a sectional view and side elevation of the surge tube.

The effluent then flows through line 20 into the surge tube 22, see FIG. 6. The effluent 104 fills the surge tube 22 with the ozone separating and being discharged through gas vent 100. A pump 26 moves water or effluent through line 24, through line 28 and through filters 30 to the discharge line 32. Extension 102 of line 24 allows the fluid to be pulled from the bottom of the surge tube 22 by pump 26. The operation of pump 26 is controlled by switches 106 and 108. The pump is then turned off until the fluid 104 again rises to the level of switch 106. Additional ozone from ozone generator 34 passes through line 36 to the surge tube 22 providing ozone treatment of the effluent 104 in the surge tube 22. The ozone bubbles through the surge tank and is discharged out the gas vent 100. The ozone normally de-generates in the surge tube 22.

The filters 30 are any commercially available filter cartridges that are replaceable and remove excess suspended and settleable solids such as "germ oxide" resulting from the ozone process, and remaining colloids.

This waste treatment system has particular application for installation on water craft or at remote installations for the purpose of separating solid waste from the aqueous and rendering the aqueous waste sewage sterile for subsequent dumping. The sterile water discharged from discharge line 32 can be discharged into any body of water such as a lake, river, or bay without contamination from organic material or pathogenic organisms. The solids are digested into liquid and gas for processing by the system. Because the system does not require bulk storage of chemicals or large holding tanks, boats equipped with this system can stay on the water longer than with other systems.

The system uses the solid/liquid separation tank to grind up the input wastes and separates the solids by physical means. The water discharged from this tank or container is then injected with ozone and after a sufficient time for sterilization, the water is passed through the surge tube and filtered for discharge. The solids collected in the separator-container are destroyed by biological action, and the unit functions primarily as a filter and biological digester. The separator-container shelters the natural bacteria in human waste and creates an ecosystem in which the bacteria live and grow. The environment therein is kept oxygenated by the system so that it works aerobicly, reducing the hydrogen sulfide and methane produced. The output is virtually odorless and the unit has no moving parts. The ozone, an allotrope of oxygen, is a powerful oxidizing agent. It kills bacteria and viruses, does not effect the taste of water and eliminates phenols, detergents and other organic compounds from water. Ozone has a clarifying effect on the water it is dissolved in and leaves no residual chemical in the water and does not have the toxicity of pure ozone in a gaseous state.

Having described my invention, I now claim:

1. The method of providing waste water treatment including the steps of,
   feeding waste water into a container having a plurality of fibers positioned therein with ends of the fibers tightly projecting into openings in the bottom of the container,
   moving the waste water around the fibers to deposit particles in the waste water on the fibers,
   venting air into said container for aerobic digestion of the particles in the container and on the fibers,
   moving the water through the openings in the bottom of the container with the fibers substantially filtering the particles from the water passing therethrough,
   moving the filtered water through a plurality of conduits serially, which conduits are spaced vertically,
   and injecting ozone gas under pressure into the individual conduits of said plurality of conduits with said ozone gas moving said water and, finally lifting the water through the conduits to successive ones of said vertically spaced conduits.

2. The method of providing waste water treatment as claimed in Claim 1 including the steps of,
   bundling the fibers to provide recesses for aerobic bacteria growth.

3. The method of providing waste water treatment as claimed in Claim 1 including the steps of,
   moving the treated water from said conduits to a surge tube,
   injecting ozone into the treated water in the surge tube for additional water treatment,
   and pumping the water from said surge tube through filters to discharge.

4. The method of providing waste water treatment as claimed in Claim 3 including the step of,
   venting excess air and ozone from said surge tube to the atmosphere.

5. The method of providing waste water treatment as claimed in Claim 1 including the step of,
   generating ozone for injection into the water in the conduit by passing air through an enclosure containing illuminated ultra-violet lamps.

6. The method of providing waste water treatment as claimed in Claim 5 including the steps of,
   generating said ozone by passing air through a container having banks of ultra-violet lamps on opposite sides of the container with an ultra-violet imprevious reflector partition positioned between said banks of ultra-violet lamps.

7. The method of providing waste water treatment as claimed in Claim 1 including the steps of,
   projecting a porous tube into each of the conduits that extends substantially the length of the conduits,
   and feeding ozone into each of said tubes and through the porous tubes into the adjacent water to be treated in the conduits.

8. The method of providing waste water treatment as claimed in Claim 7 wherein, said conduits comprise a plurality of horizontally arranged vertically spaced interconnecting conduits including the steps of,
   moving the water from the openings in the bottom of the container to the lowest ones of said conduit,
   injecting the ozone and air under pressure into the water in the conduits, and using the pressurized ozone and air gas to lift the water in said conduits so that said water discharges from the outlet of one of the most vertically positioned conduits.

9. The method of providing waste water treatment as claimed in Claim 1 including the steps of,
   using fibers that are elongated strips of wood bark,
   grouping said plurality of wood bark strips into elongated bunches,
   supporting the upper end of said wood bark bunches by a hanger in spaced vertically positioned and parallel oriented bunches,
   and providing for growth of aerobic bacteria within the open spaces of said bundles of wood bark fibers and providing a filtering water passage along the length of said wood bark fibers through said container openings.

10. A waste water treatment system comprising,
    a container for receiving waste water having a plurality of fibers therein,
    said container having a lower bulkhead with a plurality of openings therethrough,
    one of the ends of said fibers projecting into said openings forming a filter to particles in the water passing through said openings,
    a plurality of conduits being vertically spaced, and means for moving the filtered water through said conduits serially by injecting ozone gas under pressure into the individual conduits of the plurality of conduits with the ozone gas moving the water and lifting the water through the conduits to successive ones of said vertically spaced conduits.

11. A waste water treatment system as claimed in Claim 10 in which,
    said fibers being wood bark fibers.

12. A waste water treatment system as claimed in Claim 11 in which,
    said wood bark fibers being arranged in bundles and in substantially vertical positions in said container with the upper portions thereof being supported by support means,
    and said bundles of wood fibers being tightly grouped to provide recesses for aerobic bacteria growth and for receiving and holding particles and for passing water along lengths thereof through said bulkhead openings.

13. A waste water treatment system as claimed in Claim 10 in which,
    said container having a sump below said openings for receiving filtered water passing through said bulkhead openings,
    said plurality of conduits being individually oriented in substantially horizontal positions with ones of said conduits being vertically positioned above others of said conduits and being interconnected for transporting water therethrough, and ozone source means for supplying ozone under pressure to said movings means.

14. A waste water treatment system as claimed in Claim 13 in which,
surge tube means for receiving water from said conduit means,
pump means for pumping water from said surge tube to pass said water through filters and to a discharge,
and means for injecting ozone into said surge tube.

15. A waste water treatment system as claimed in Claim 13 in which,
said moving means comprising a tube positioned longitudinally in each of said conduits which tubes are porous to the passage of ozone therethrough into the water.

16. A water treatment system as claimed in Claim 15 in which,
each of said porous tubes extend substantially the length of each of said conduits.

17. A waste water treatment system as claimed in Claim 16 in which,
said ozone source means comprising a container having a plurality of ultra-violet lamps extending along each side thereof,
an ultra-violet light impervious and reflecting baffle positioned in said container and between said banks of ultra-violet lights,
and means for passing air under pressure through said container to said injecting means.

References Cited
UNITED STATES PATENTS

| | | | |
|---|---|---|---|
| 3,700,590 | 10/1972 | Burton | 210—17 |
| 3,276,994 | 10/1966 | Andrews | 210—63 |
| 3,550,782 | 12/1970 | Veloz | 210—192 |
| 3,696,929 | 10/1972 | Shah | 210—63 |
| 3,617,541 | 11/1971 | Pan | 210—17 |

FRANK A. SPEAR, JR., Primary Examiner

P. A. HRUSKOCI, Assistant Examiner

U.S. Cl. X.R.

210—192, 202, 260

UNITED STATES PATENT OFFICE
CERTIFICATE OF CORRECTION

Patent No. 3,835,039   Dated September 10, 1974

Inventor(s)  David Ciambrone

It is certified that error appears in the above-identified patent and that said Letters Patent are hereby corrected as shown below:

In the assignor line, the city of "San Francisco" should read --San Diego--.

Column 1, line 54, the word "dveloped" should read --developed--.

Column 2, line 5, the word "embodiments" should read --embodiment--.

Column 2, line 11, the word "cotnainer" should read --container--.

Column 2, line 35, the word "as" should read --has--.

Signed and sealed this 26th day of November 1974.

(SEAL)
Attest:

McCOY M. GIBSON JR.
Attesting Officer

C. MARSHALL DANN
Commissioner of Patents